United States Patent [19]

Umezawa et al.

[11] Patent Number: 5,419,217
[45] Date of Patent: May 30, 1995

[54] MACHINE ELEMENT WITH AT LEAST A FITTING MEMBER PRESSURE-FITTED ON A SHAFT AND METHOD OF MAKING THE SAME

[75] Inventors: Koji Umezawa; Tamio Sakurai, both of Tochigi, Japan

[73] Assignee: Nippon Piston Ring Co., Ltd., Tokyo, Japan

[21] Appl. No.: 83,323

[22] Filed: Jun. 29, 1993

Related U.S. Application Data

[63] Continuation of Ser. No. 791,528, Nov. 14, 1991, abandoned.

[30] Foreign Application Priority Data

Nov. 19, 1990 [JP] Japan ................................. 2-311431

[51] Int. Cl.$^6$ ........................ F16H 53/00; F01L 1/04
[52] U.S. Cl. ........................ 74/567; 74/434;
123/90.6; 123/90.39; 29/888.1; 403/282;
403/359
[58] Field of Search ................ 74/567, 569, 566, 434;
29/888.1, 523.1, 421; 403/282, 359, 383;
123/90.6, 90.31, 90.17, 90.51, 90.39

[56] References Cited

U.S. PATENT DOCUMENTS

| | | | |
|---|---|---|---|
| 4,006,993 | 2/1977 | Woerlee | 403/359 |
| 4,597,365 | 7/1986 | Madaffer | 74/567 |
| 4,835,832 | 6/1989 | Arnold et al. | 74/507 |
| 4,870,872 | 10/1989 | Parsons | 74/567 |
| 4,882,825 | 11/1989 | Nakamura | 74/567 |
| 4,903,543 | 2/1990 | Matt | 403/282 |
| 4,947,547 | 8/1990 | Matt | 29/888.1 |
| 4,947,763 | 8/1990 | Sibata et al. | 403/359 |
| 5,272,930 | 12/1993 | Nakamura et al. | 74/434 |

FOREIGN PATENT DOCUMENTS

| | | | |
|---|---|---|---|
| 0091311 | 5/1983 | Japan | 123/90.6 |
| 0199907 | 9/1987 | Japan | 123/90.6 |
| 0248808 | 10/1987 | Japan | 123/90.6 |
| 0751410 | 11/1987 | Japan | 123/90.6 |

*Primary Examiner*—Carl D. Friedman
*Assistant Examiner*—Winnie Yip
*Attorney, Agent, or Firm*—Birch, Stewart, Kolasch & Birch

[57] ABSTRACT

A machine element has a shaft and at least a fitting member such as a cam or gear mounted on the shaft by pressure-fit. The fitting member has a bore for receiving the shaft. The shaft is formed with protrusions at least an area of the shaft on which the fitting member is fitted. The protrusions preferably extend continuously or discretely, peripherally or helically on the outer surface of the shaft and have a diameter larger than than the remaining areas of the shaft. The bore of the fitting member is formed with at east an inner chordal surface having a perpendicular from the center of the bore smaller than the radius of the protrusions. The fitting member is configured to be forced onto the protrusions of the shaft with at least one inner chordal surface forming a corresponding outer surface on the protrusions in a shaving and/or deforming operation.

20 Claims, 4 Drawing Sheets

RELATION AMONG KNURLING, BONDING STRENGTH AND PRESSURE-FITTING LOAD

ANNULAR-GROOVE KNURLING
△

DIAMOND KNURLING
○

AXIAL-GROOVE KNURLING
□

RELATION BETWEEN POLYGONAL BORE AND BONDING STRENGTH

MACHINE ELEMENT WITH AT LEAST A FITTING MEMBER PRESSURE-FITTED ON A SHAFT AND METHOD OF MAKING THE SAME

This application is a continuation of application Ser. No. 07/791,528 filed on Nov. 14, 1991, now abandoned.

BACKGROUND OF THE INVENTION

1. Field of the Invention

The present invention relates to a machine element of the type having at least a fitting member pressure-fitted on a shaft, such as a camshaft for use in internal combustion engines, a shaft-supported gear, and a shaft-supported rotor. The fitting member has a bore for receiving the shaft, which is eccentric to the center of the fitting member for use in the camshaft or the like and concentric in the shaft-supported gear or the like. At least one portion of the area of the shaft in which the fitting member is to be provided has a diameter which is greater than the remaining areas of the shaft. The bore has at least a narrow portion defining a spacing diametrically smaller than the increased diameter portion of the shaft. The fitting member is forced onto the increased diameter portion of the shaft with the narrow portion of the bore cutting and/or deforming the increased diameter portion.

The present invention a also relates to a method of manufacturing the above-described machine element.

2. Description of the Prior Art

Machine elements are known in which the fitting members and the shafts, separately manufactured, are assembled by a press fit accompanying a chip-removing operation. U.S. Pat. No. 4,903,543 or U.S. Pat. No. 4,947,547 describes a camshaft which includes a shaft and at least one cam slid onto and connected to the shaft in an area of the shaft. The cam defines a bore for receiving the shaft. The bore has at least one radially inwardly directed projection. At least one portion of the area off the shaft has a diameter larger than the remaining areas of the shaft. The increased diameter portion of the shaft is a bead-like material displacement which extends circumferentially on the shaft and is manufactured by rolling. The cam is forced onto the increased diameter portion of the shaft with a projection in the bore of the cam for forming in a chip-removing operation, a groove in the increased diameter portion.

The projection is so finished as a cutting edge with an angular cross-section to form the groove in the outer surface off the shaft. It is also required for the fitting member to be harder than the shaft, since the fitting member must cut the groove off on the shaft with its projection. However, it is not easy to provide and finish the axially extending angular projection as a cutting edge within the bore of the fitting member. The cost of manufacturing the camshaft considerably rises when the fitting member is made from a harder material for coupling with the relatively hard shaft.

The object of the present invention is to provide a machine element in which at least one fitting member is pressure-fitted onto the increased diameter portion of a shaft with at least an inner wall portion of the fitting member shaving and/or deforming the outer surface of the shaft for a tight connection therebetween, while the fitting member is manufactured with ease at a relatively low cost. Another object of the present invention is to provide an assembling method to manufacture the aforementioned machine element.

SUMMARY OF THE INVENTION

In accordance with the present invention, the shaft has protrusions on the outer surface thereof in the area of the shaft in which the fitting member is to be mounted. The protrusions have a diameter larger than the remaining areas of the shaft. The protrusions extend continuously or discretely and axially, peripherally or helically on the shaft and are formed by means of the known manner as padding, cutting, rolling and knurling. The fitting member has a bore, concentric or eccentric to the center of the fitting member, for receiving the shaft. The bore is formed with at least a chordal inner surface as an inner wall portion defining a space diametrically smaller than the protrusions. The chordal surface has such a perpendicular chord from the center of the bore that is adequately smaller than the radius of the protrusions. The bore in the fitting member consists of alternately connected arcuate and chordal surfaces in which the inner diameter of the arcuate surface is slightly larger than the outer diameter of the protrusions. It is also composed of a plurality of chordal surfaces in the form of a polygon. The fitting member is not always required to be harder than the shaft or the protrusions thereof. It can be similar in hardness to the shaft or the protrusions thereof.

The fitting member is forced onto the protrusions of the shaft with the inner chordal surface of the fitting member forming in a shaving and/or deforming operation an outer chordal surface on the protrusions for a tight connection between the fitting member and the shaft. In the procedure of pressure-fitting the shaft into the bore of the fitting member, the chordal surface of the bore has the central portion thereof for shaving engagement with the protrusions of the shaft when the fitting member is harder than the shaft or for plastically deforming engagement with the protrusions of the shaft when the fitting member is similar in hardness to the shaft. Both side portions adjacent to central portion of the bore force the protrusions to deform partly plastically, partly elastically, so that the inner chordal surface of the bore is secured to a corresponding outer surface formed in the protrusions by a shaving and/or deforming operation. This connection is substantially similar to an angular joint. It ensures that the machine element thus assembled has no relative motion arising between the shaft and the fitting member under practical working conditions.

It is easy to form and finish the flat chordal surface within the bore as tile cutting edge for shaving and/or deforming the protrusions of the shaft as compared with the known projection in the form of an angular cutting edge for forming a groove in the outer surface of the shaft. Another advantage of the present invention is that the fitting member is not required to be harder than the shaft. Therefore, the machine element according to the present invention can be manufactured with ease at a lower cost than the prior art.

BRIEF DESCRIPTION OF THE DRAWINGS

The Present invention will become more fully understood from the detailed description given hereinbelow and the accompanying drawings which are given by way of illustration only, and thus, are not limitative of the present invention.

DETAILED DESCRIPTION OF THE INVENTION

Figure 1:
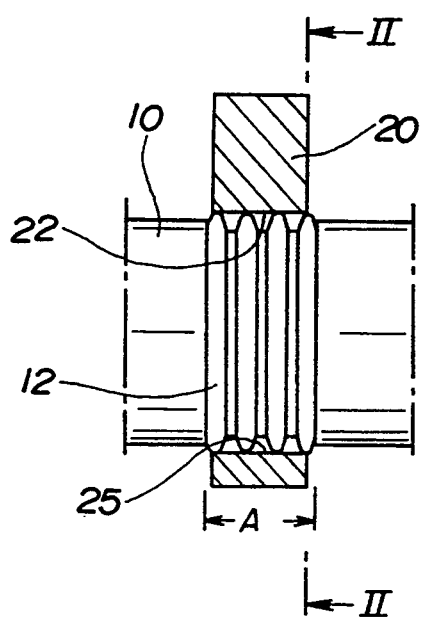
FIG. 1 is a partial longitudinal sectional view of the camshaft according to the present invention.
Figure 2:
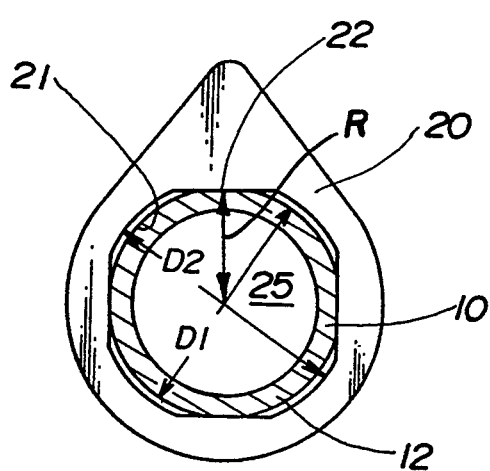
FIG. 2 is a cross-sectional view taken along the line II—II of FIG. 1.
Figure 3:
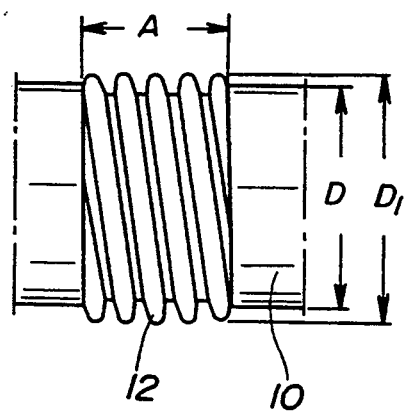
FIG. 3 is a partial longitudinal view of the shaft with helically, continuously extending protrusions.
Figure 4:
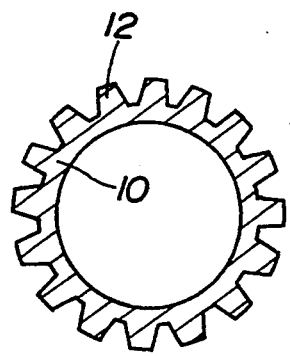
FIG. 4 is a cross-sectional view of the shaft with peripherally or helically, discretely extending protrusions.

As seen in FIGS. 1 and 2, the shaft 10 has a fitting area A on which the cam piece 20 is fitted. The area is provided on the outer periphery thereof with a plurality of peripherally extending protrusions 12 in the form of an annular-groove knurling. The protrusions are previously formed by rolling for fitting engagement with the chordal inner surface 22 which is formed in the bore 25 of the cam piece 20 to assemble the cam piece and the shaft into a camshaft. The peripheral or helical protrusions in the form of an annular or helical-groove knurling can be formed by means of pressure deformation, for example, by rolling. The protrusions extend continuously, peripherally in the form of an annular-groove knurling as seen in FIG. 1. The protrusions extend continuously, helically in the form of a helical-groove knurling as seen in FIG. 3. The protrusions extend discretely, peripherally or helically in the form of a criss-cross or diamond knurling as seen in FIG. 4. The protrusions in the form of a coarse criss-cross or diamond knurling are shaped by knurling. The knurled and rolled protrusions are preferable considering an efficiency in production.

As seen in FIG. 2, the protrusions 12 have an outer diameter D1 larger than the outer diameter D of the shaft 10 except the fitting area A in which the individual root between the two adjacent protrusions 12 has a diameter smaller than D. As seen in FIG. 2, the bore in the cam piece 20 consists of inner arcuate surfaces 21 and inner chordal surfaces 22 which are alternately, circumferentially connected. The arcuate surface 21 has a diameter D2 larger than the diameter D1 of the protrusions 12. The chordal surface 22 has a perpendicular chord R from the center of the bore 25 that is shorter than the radius of the protrusions 12 but longer than the radius of the root between the two adjacent protrusions. If the inner diameter D2 were smaller than or equal to the other diameter D1, a highly tight fitting would be obtained. However, it is preferable for an efficient assembling of the cam piece and the shaft that the inner diameter D2 of the inner arcuate surface is larger than the outer diameter D1 of the protrusions. The bore 25 of FIG. 2 consists of four similar arcuate surfaces 21 and four similar chordal surfaces 22. It can consists of any number of arcuate or chordal surfaces. Both or either of arcuate and chordal surfaces may be in number more or less than 4. For example, an arcuate surface and a chordal surface can constitute the bore. Furthermore, the bore in the shape of a polygon is formed only by the chordal surfaces. The polygonal bore makes a tight fitting with the shaft so that there occurs no relative motion between the fitting member and the shaft. The chordal surface is easy to manufacture and finish since it is simple and flat. This results to remarkably reduce the cost of manufacturing the camshaft as compared with the conventional camshaft.

Figure 5:
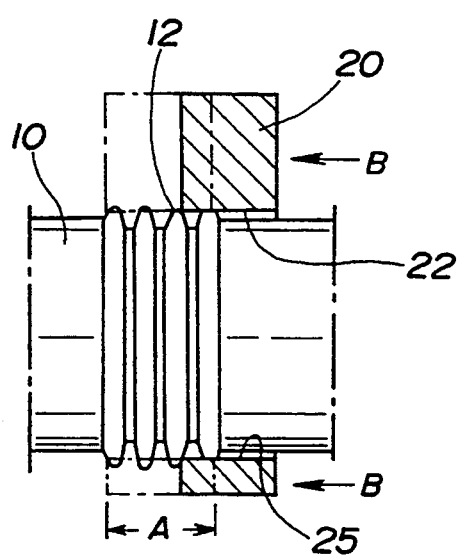
FIG. 5 is a partial longitudinal sectional view of the camshaft illustrating the cam piece being slid onto the protrusions of the shaft.

As seen by the arrow B in FIG. 5, the cam piece 20 is axially slid onto the fitting area A from an end of the shaft 10. Then, tile chordal surface 22 within the bore 25 of the cam piece 20 has its central portion shaving the protrusions 12 partly, both side portions adjacent to the central portion deforming the same plastically, and both further side portions deforming the same elastically, so that the cam piece 20 is tightly fitted on the protrusions.

Figure 6:
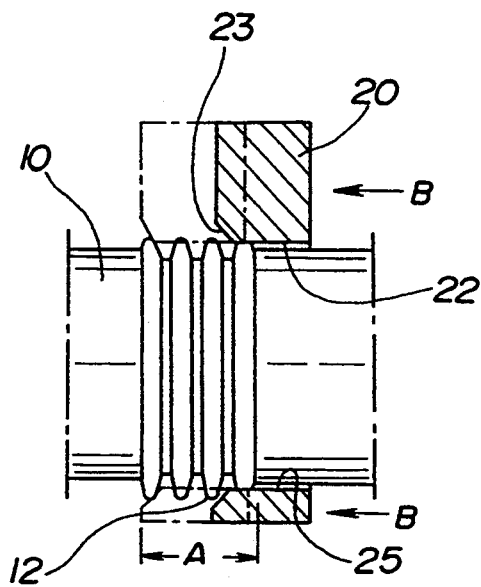
FIG. 6 is a view similar to FIG. 5 but showing the cam piece chamferred at the forward end of the bore.

As seen in FIG. 6, the cam piece 20 is chamferred at the forward end of the bore 25 and formed with a conical surface 23. When the cam piece 20 is slid onto the fitting area A of the shaft in the direction shown by the arrow B, the conical surface 23 facilitates the inner chordal surface 22 to form the corresponding outer surface on the protrusions 12 of the shaft 10 in a shaving and/or deforming operation. The conical surface 23 also serves as a stopper to determine the axial position of the cam piece on the shaft.

Figure 7:
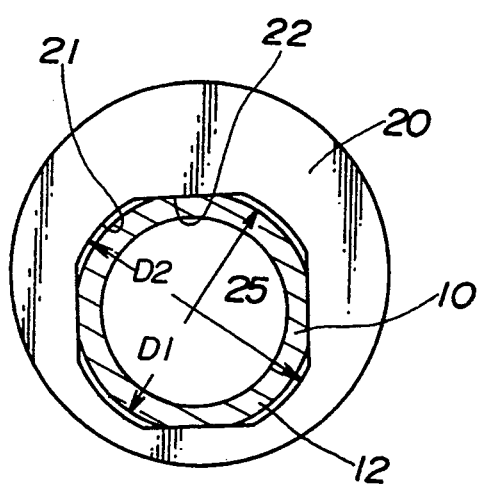
FIG. 7 is a cross-sectional view of the shaft-supported rotor for use in a rotary compressor.

There is shown a shaft-supported rotor for use in a rotary compressor in FIG. 7, in which the rotor body 20 in the form of a disk is tile fitting member. The bore 25 is eccentric to the center of the rotor body 20. The shaft 10 has the protrusions 12 formed on the outer surface in the fitting area of the shaft by means of pressure deformation. The bore 25 is composed of four inner arcuate surfaces 21 and four inner chordal surfaces 22, alternately connected to each other. The diameter D1 of the protrusions 12 is smaller than the diameter D2 of the arcuate surface 21, while the radius of the protrusions 12 is larger than the perpendicular chord to the chordal surface 22 from the center of the bore 25. The shaft-supported rotor has the same longitudinal section as shown in FIG. 1.

Figure 8:
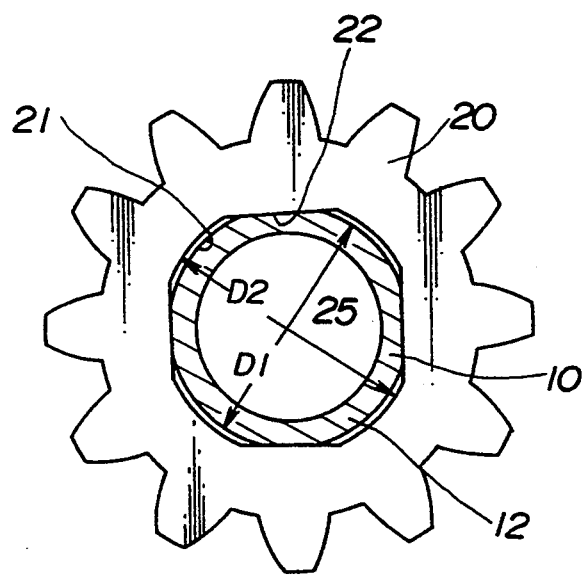
FIG. 8 is a cross-sectional view of the shaft-supported spur gear.

A shaft-supported gear is shown in FIG. 8, in which the spur gear 20 is the fitting member. The bore 25 is concentric to the center of the gear 20. There is the same relation among the diameter D1 of the protrusions 12, the diameter D2 of the inner arcuate surfaces 21, and the perpendicular chord to the inner chordal surface 22 from the center of the bore 25 as shown in FIG.

Figure 9:
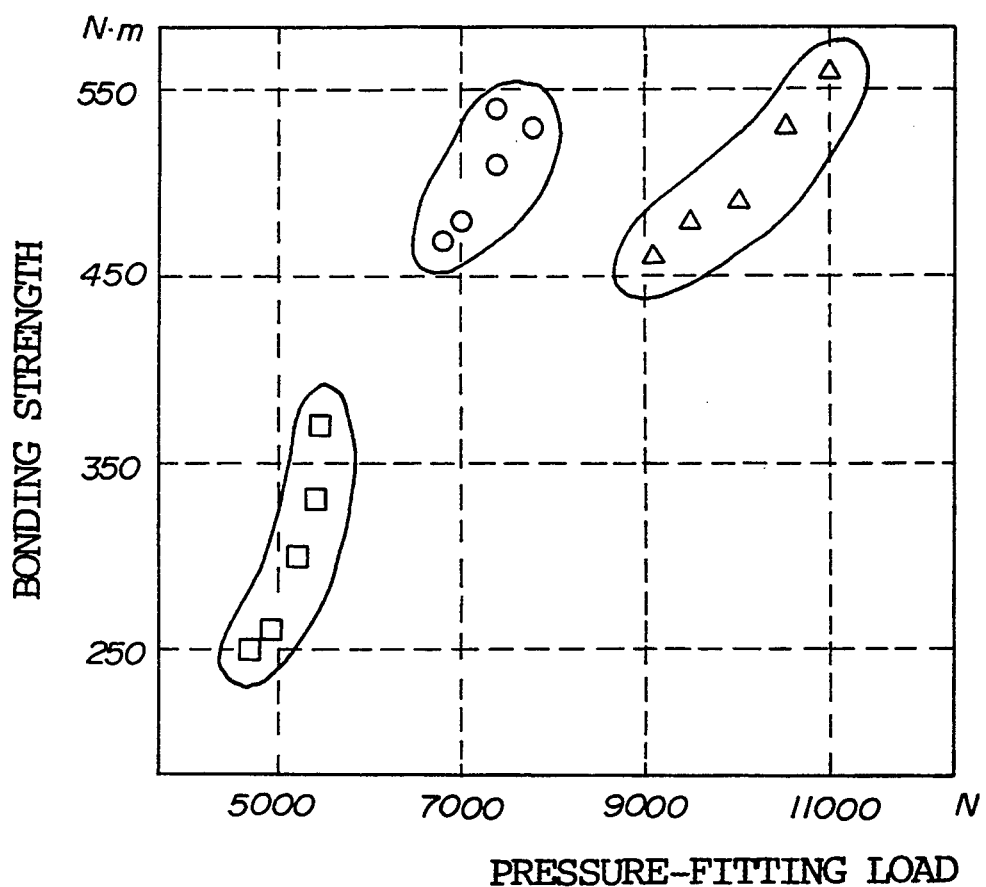
FIG. 9 is a graph illustrating the relation among the type of the protrusions, the pressure-fitting load, and the bonding strength between the fitting member and the shaft.
Figure 9:
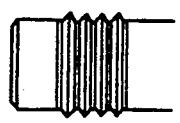
Figure 9:
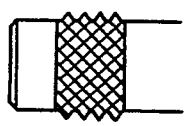
Figure 9:
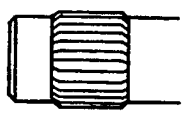

Three sorts of protrusions were formed on the outer surface of the shafts and tested by measuring the pressure-fitting load when inserted into the hexagonal bore of the fitting members and the bonding strength between the shaft and the fitting member after the protrusions being inserted into the bore. The fitting members were made from a Fe-8% Cr alloy and had an axial length of 11 mm. The shafts were made from a steel similar to SAE 1050. The first protrusions extended continuously, axially in the form of axial-groove knurling. The second protrusions extended discretely, peripherally or helically in the form of a criss-cross or diamond knurling. The third protrusions extended continuously, peripherally in the form of an annular-groove knurling. The hexagonal bore had an inscribed circle which was radially smaller by 0.8 mm than the protrusions, so that there was in maximum a radial interference of 0.8 mm between the fitting members and the shafts. The test results are shown in FIG. 9, which illustrates that the axial-groove knurling gives the relatively small bonding strength or applicable torque to the machine element, although it needs the relatively small pressure-fitting load, that the criss-cross and annular-groove knurlings advantageously give the relatively large bonding strength or applicable torque to the machine element, and that the criss-cross knurling needs the pressure-fitting load less than the annular-groove knurling.

Figure 10:
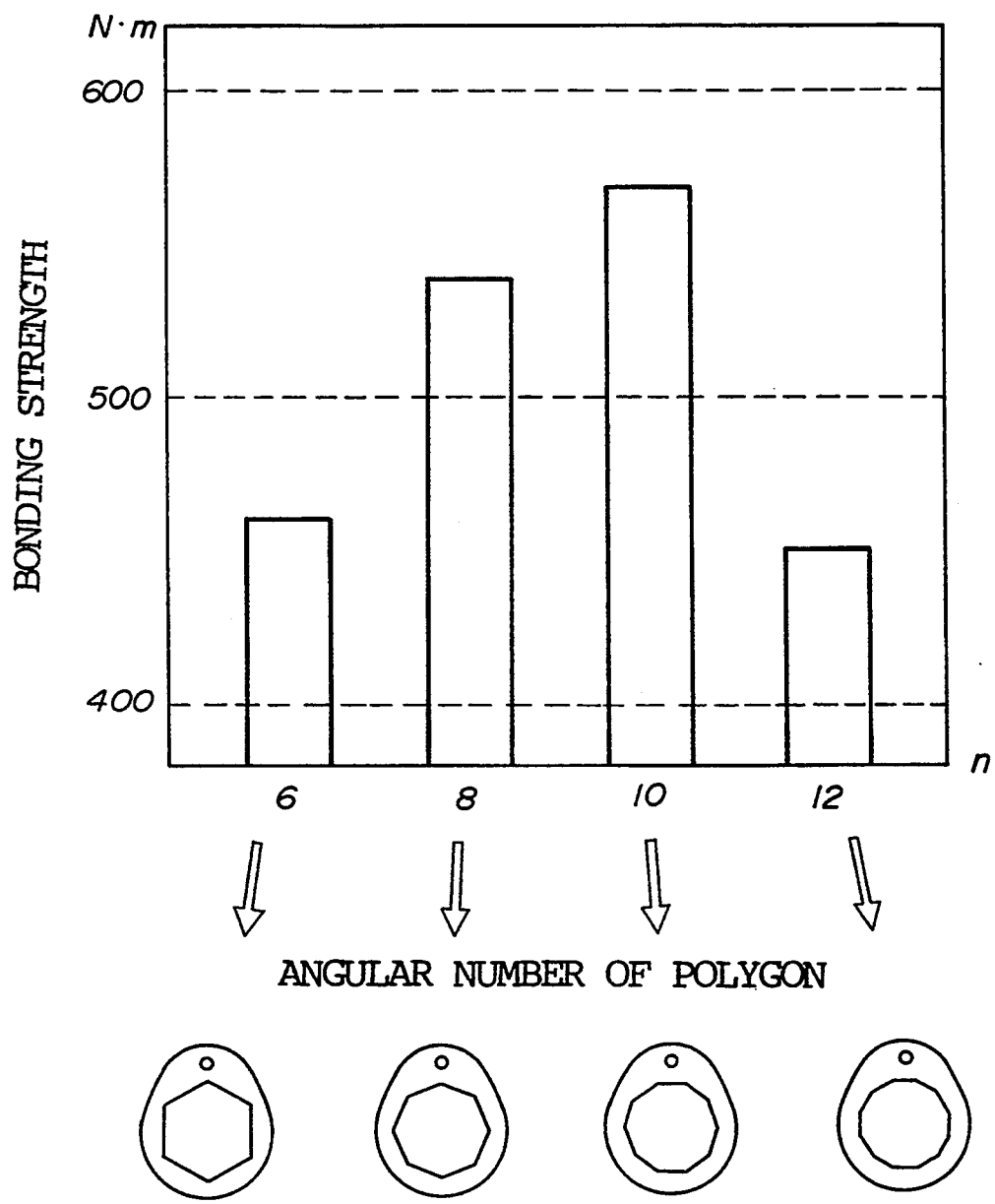
FIG. 10 is a graph illustrating tile relation between the angular number of the polygonal bores in the fitting members and the bonding strength between the fitting members and the shaft.

Regular hexagonal, octagonal, decagonal and dodecagonal bores in the fitting members were tested by measuring the bonding strength between the fitting members and the shafts after each bore being forced onto the protrusions in the form of the criss-cross knurling on the shaft. To be exact, the polygonal bores are composed of relatively long chordal sides and relatively short arcuate sides. The polygonal bores had the same circumcircle which was radially larger by 0.8 mm than the protrusions, so that there was in maximum a radial interference between the fitting member and the protrusions. The fitting members and the shafts were made from the same materials as those illustrated in FIG. 9. The test results are shown in FIG. 10 in which the graph illustrates the relation between the angular number of the regular polygonal bores and the bonding strength. From FIG. 10 it is known that the polygonal bores with an angular number of 8 to 10 are superior in bonding strength or applicable torque to the hexagonal and dodecagonal bores.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A machine element comprising:
   a shaft member; and
   at least one fitting member pressure-fitted on said shaft, said at least one fitting member having a bore for receiving said shaft and said shaft having at least an area formed with diamond knurling protrusions on which the fitting member is fitted,
   wherein said bore includes alternating arcuate and chordal surfaces on an inner peripheral surface thereof, at least one of said chordal surfaces having a perpendicular chord from a center of the bore shorter than a radius of the diamond knurling protrusions as measured from an axial center of the shaft and the arcuate surfaces being included in a circumcircular inner surface of the bore, whereby the fitting member is configured to be forced onto the diamond knurling protrusions of the shaft with at least one of said chordal surfaces of the bore engaging a corresponding outer surface on the diamond knurling protrusions.

2. The machine element according to claim 1, wherein the bore of said at least one fitting member is in the form of a regular polygon of which the angular number is in a range of 6 to 12.

3. The machine element according to claim 1, wherein said machine element is a camshaft with a plurality of cam pieces fitted on the shaft.

4. The machine element according to claim 1 wherein said fitting member is made of a Fe-8%Cr alloy and said shaft member is made from steel.

5. The machine element according to claim 4, wherein a hardness of said fitting member is greater than a hardness of the protrusions of said shaft member.

6. The machine element according to claim 4, wherein a hardness of said fitting member is similar to a hardness of the protrusions of said shaft member.

7. A machine element comprising
   a shaft member; and
   at least one fitting member pressure-fitted on said shaft, said at least one fitting member having a bore for receiving said shaft and said shaft having at least an area formed with axial-groove knurling protrusions on which the fitting member is fitted,
   wherein said bore includes alternating arcuate and chordal surfaces on an inner peripheral surface thereof, at least one of said chordal surfaces having a perpendicular chord from a center of the bore shorter than a radius of the axial-groove knurling protrusions as measured from an axial center of the shaft and the arcuate surfaces being included in a circumcircular inner surface of the bore, whereby the fitting member is configured to be forced onto the axial-groove knurling protrusions of the shaft with at least one of said chordal surfaces of the bore engaging a corresponding outer surface on the protrusions.

8. The machine element according to claim 7, wherein the bore of said at least one fitting member is in the form of a regular polygon of which the angular number is in a range of 6 to 12.

9. The machine element according to claim 7, wherein said machine element is a cam shaft with a plurality of cam pieces fitted on the shaft.

10. The machine element according to claim 7, wherein said fitting member is made of a Fe-8%Cr alloy and said shaft member is made from steel.

11. The machine element according to claim 10, wherein a hardness of said fitting member is greater than a hardness of the protrusions of said shaft member.

12. The machine element according to claim 10, wherein a hardness of said fitting member is similar to a hardness of the protrusions of said shaft member.

13. A machine element comprising:
    a shaft member; and
    at least one fitting member pressure-fitted on said shaft, said at least one fitting member having a polygon-shaped bore for receiving said shaft and said shaft having at least an area formed with protrusions on which the fitting member is fitted,
    wherein said polygon-shaped bore of said at least one fitting member is in a form of a regular polygon of which the angular number is in a range of 6 to 12 on an inner peripheral surface thereof, each surface of said polygon-shaped bore having a perpendicular chord from a center of the bore shorter than a radius of the protrusions as measured from an axial center of the shaft whereby the fitting member is configured to be forced onto the protrusions of the shaft with radially outer surfaces of said polygon-shaped bore engaging a corresponding outer surface on the protrusions.

14. The machine element according to claim 13, wherein a formation of said protrusions are selected from the group consisting of diamond, axial-groove, and helical-groove knurlings.

15. The machine element according to claim 13, wherein said machine element is a cam shaft with a plurality of cam pieces fitted on the shaft.

16. The machine element according to claim 13, wherein said fitting member is made of a Fe-8%Cr alloy and said shaft member is made from steel.

17. The machine element according to claim 13, wherein a hardness of said fitting member is greater than a hardness of the protrusions of said shaft member.

18. The machine element according to claim 13, wherein a hardness of said fitting member is similar to a hardness of the protrusions of said shaft member.

19. The machine element according to claim 13, wherein said protrusions extend continuously around an outer periphery of said shaft in a form of an annular-groove knurling.

20. The machine element according to claim 13, wherein said protrusions extend continuously and helically around an outer periphery of said shaft in a form of a helical-groove knurling.

* * * * *